US007269442B2

United States Patent
Sato et al.

(10) Patent No.: US 7,269,442 B2
(45) Date of Patent: Sep. 11, 2007

(54) INFORMATION TERMINAL DEVICE PROVIDED WITH TURNING FUNCTION-CARRYING CAMERA

(75) Inventors: Noriyoshi Sato, Yokohama (JP); Yutaka Masutani, Yokohama (JP); Koichi Yoda, Machida (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1033 days.

(21) Appl. No.: 10/416,411

(22) PCT Filed: May 16, 2002

(86) PCT No.: PCT/JP02/04747

§ 371 (c)(1),
(2), (4) Date: May 8, 2003

(87) PCT Pub. No.: WO02/104008

PCT Pub. Date: Dec. 27, 2002

(65) Prior Publication Data

US 2004/0023684 A1 Feb. 5, 2004

(30) Foreign Application Priority Data

Jun. 19, 2001 (JP) ............................. 2001-185261

(51) Int. Cl.
*H04M 1/00* (2006.01)
(52) U.S. Cl. ................................. 455/556.1; 455/575.1; 455/575.3; 348/14.02; 348/333.06
(58) Field of Classification Search ............ 455/556.1, 455/575.1, 575.3, 344; 348/14.01, 14.08, 348/360, 376, 333.06, 207.99; 379/441, 379/433.13
See application file for complete search history.

(56) References Cited

U.S. PATENT DOCUMENTS 6,069,648 A * 5/2000 Suso et al. ................ 348/14.02
7,046,287 B2 * 5/2006 Nishino et al. ......... 348/333.06

FOREIGN PATENT DOCUMENTS

EP 0 898 405 A2 2/1999

(Continued)

OTHER PUBLICATIONS

Patent Abstracts of Japan, Iwasaki Morio, "Information Portable Terminal Provided With Image-Pickup Function", Publication No.: 2000253124, Publication Date: Sep. 14, 2000, 1 page.

*Primary Examiner*—Melur Ramakrishnaiah
(74) *Attorney, Agent, or Firm*—Pearne & Gordon LLP

(57) ABSTRACT

In an information terminal apparatus with a camera having a rotating function, the object of the invention is to impart a predetermined torque to a camera so as to render the camera easily rotatable by the force of a finger in a desired direction and to continue its state of standstill when the rotation is stopped.

An information terminal apparatus with a camera having a rotating function in accordance with the invention comprises: a camera unit including a cylindrical member 62 having a shaft portion 62C at one end thereof and for accommodating a camera therein, and an annular member 72 which is fitted over the shaft portion 62C; a main body portion 1 having a bearing portion 42 for holding the annular member 72 and for rotatably supporting the camera unit; and an elastic member 74 provided between the main body portion 1 and the cylindrical member 72, wherein the elastic member 74 is arranged to impart a direction-of-axis force in an axial direction of the camera unit while moving together with the rotation of the camera unit.

7 Claims, 4 Drawing Sheets

FOREIGN PATENT DOCUMENTS

| | | |
|---|---|---|
| JP | 10-75287 A | 3/1998 |
| JP | 2000-253124 A | 9/2000 |
| JP | 2001-186383 | 7/2001 |
| JP | 2002-112081 | 4/2002 |

* cited by examiner

INFORMATION TERMINAL DEVICE PROVIDED WITH TURNING FUNCTION-CARRYING CAMERA

TECHNICAL FIELD

The present invention relates to an information terminal apparatus with a camera which is applicable as a portable telephone with a camera, a portable picture phone, or the like, and more particularly to an information terminal apparatus with a camera having a rotating function which is provided with an arrangement for imparting torque to a rotatable camera.

BACKGROUND ART

In recent years, in conjunction with the substantial improvement of data transmission capabilities, in portable telephones attempts are being made to use the portable telephone not only as a terminal for voice communications but to use it widely as a data communication terminal.

For example, as one form of use as the data communication terminal, an arrangement has been proposed and developed in which a camera is mounted in the portable telephone, and which is capable transmitting image data picked up by this camera in real time.

Meanwhile, with this data communication terminal, since various component parts such as a display, operation buttons, a microphone, a speaker, and an antenna must be accommodated efficiently in a limited narrow space, restrictions are similarly imposed on the place of installation of the camera as well.

Because of such circumstances, a data communication terminal with a camera is known which is arranged such that, for instance, a rectangular notched portion is provided in a side surface or an upper end surface of the data communication terminal, and a camera body is rotatably disposed in this notched portion. With such a data communication terminal with a camera, the arrangement provided is such that, by disposing the camera body rotatably, the orientation of the camera body can be adjusted to a desired direction, and the camera body can be also oriented in the direction of an operator himself or herself.

However, with the data communication terminal with a camera of the construction having such a rotating function, if the torque at the time of rotating the camera body is close to zero, there is a possibility that the camera body rotates slightly soon after the camera body is stopped after its orientation is adjusted to a desired direction. For this reason, since blurring occurs in the picked-up image, the user must effect shooting while holding the camera body with his or her fingers to avoid this, and the operability hence becomes extremely difficult.

Alternatively, if the torque at the time of rotating the camera body is extremely large, the camera body becomes difficult to rotate even if an attempt is made to adjust the orientation of the camera body to a desired direction. Therefore, there is a problem in that operability becomes difficult such as in that usability becomes poor.

Accordingly, in view of the above-described circumstances, the object of the present invention is to provide an information terminal apparatus with a camera having a rotating function which makes it possible to impart a predetermined torque to the camera body, makes it possible to stop the camera body continuously after being adjusted to a desired orientation, and makes it possible to rotate the camera body easily with the force of a finger.

DISCLOSURE OF THE INVENTION

First, the information terminal apparatus with a camera having a rotating function in accordance with the invention is characterized by comprising an imaging unit 6 including: a cylindrical camera unit rotatably supported by a main body portion of the information terminal apparatus; direction-of-axis force imparting means 74 formed of an elastic member for imparting a direction-of-axis force in a thrusting direction of the camera unit; and means 71 for preventing the occurrence of torsional stress for preventing the occurrence of torsional stress in the direction-of-axis force imparting means 74.

Accordingly, since it is possible to prevent the occurrence of torsional stress in the elastic member while a direction-of-axis force is being imparted in the thrusting direction of the camera unit, it is possible to allow a predetermined rotational torque to be generated in the camera unit, and the state of rotation stop can be continued in a stable manner.

Second, the information terminal apparatus with a camera having a rotating function in accordance with the invention is characterized by comprising an imaging unit including:

a camera unit including a cylindrical member 62 having a shaft portion 62C at one end thereof and for accommodating a camera therein, and an annular member 72 which is fitted over the shaft portion 62C; and an elastic member 74 provided between the cylindrical member 62 and a main body portion of the information terminal apparatus having a bearing portion 42 for holding the annular member 72 and for rotatably supporting the camera unit, so as to impart a direction-of-axis force in a thrusting direction of the camera unit, wherein the elastic member 74 is provided so as to rotate together with the rotation of the camera unit.

Accordingly, since it is possible to prevent the occurrence of torsional stress in the elastic member while a direction-of-axis force is being imparted in the thrusting direction of the camera unit, it is possible to allow a predetermined rotational torque to be generated in the camera unit, and the state of rotation stop can be continued in a stable manner.

Third, the elastic member is interposed between the camera unit and the main body portion.

Accordingly, since the elastic member can be rotated together with the rotation of the camera unit, it is possible to prevent the occurrence of the torsional stress in the elastic member with a simple arrangement.

Fourth, the elastic member is formed of a rubber member and is provided in such a manner as to be compressed in the thrusting direction of the camera unit.

Accordingly, since a rubber member such as silicone rubber or synthetic rubber can be used, it is unnecessary to increase the strength of the elastic member, and it is possible to avoid an increase in cost. In addition, since these rubber members excel in moldability and are readily available, the arrangement is suitable for mass production. In addition, the torque can be imparted to the camera unit with a simple arrangement, and the heavy weight of the apparatus can be avoided.

Figure 1:
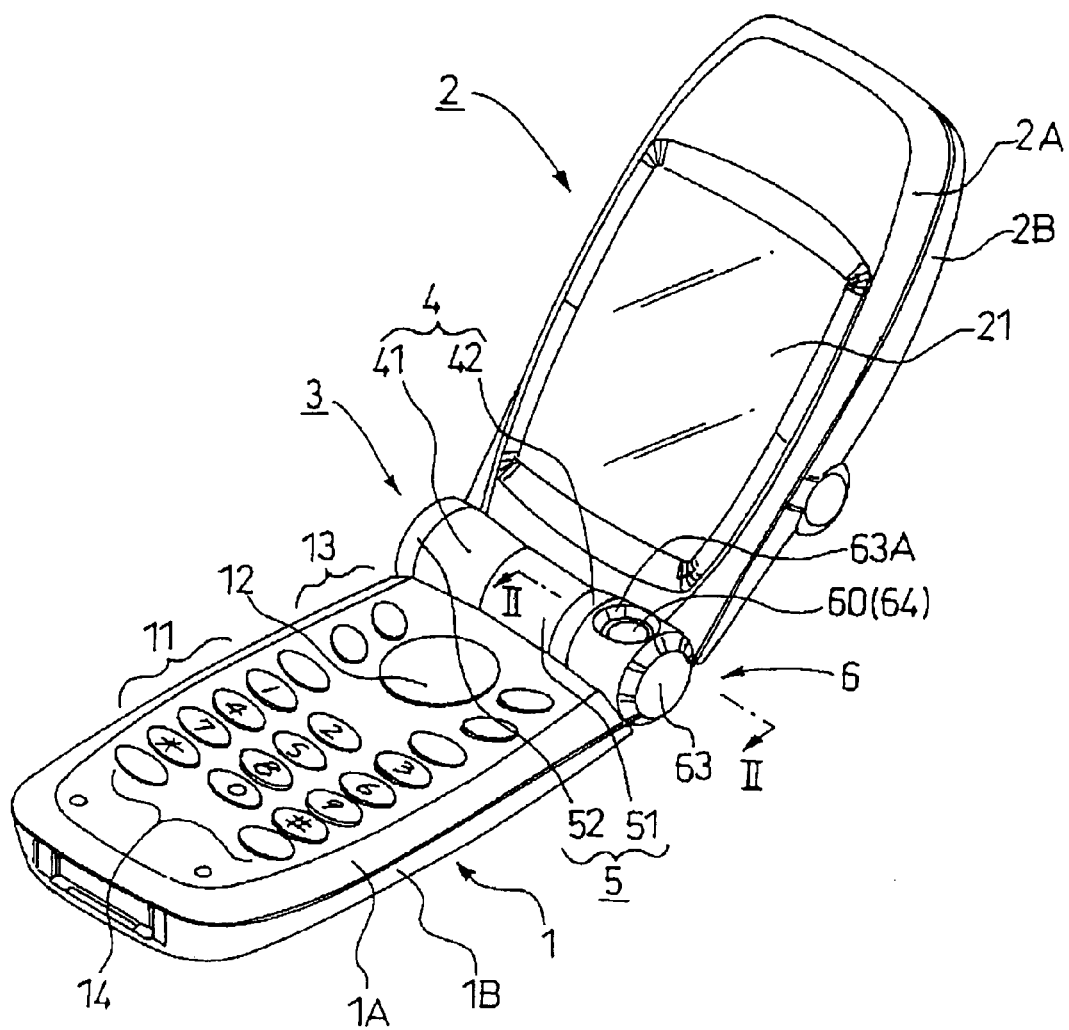
FIG. 1 is a perspective view to which a portable terminal apparatus with a camera in accordance with an embodiment of the invention is applied.

For information, reference numerals in the drawings represent as follows; 1 is a lower housing (main body portion), 1A is an inner casing, 1B is an outer casing, 1C is an inner frame, 2 is an upper housing (main body portion), 2A is an inner casing, 2B is an outer casing, 2C is an inner frame, 3 is a hinge portion (main body portion), 4 is a lower hinge, 41 is a first rotating portion (lower housing side), 42 is a second rotating portion (lower housing side) (bearing portion), 5 is an upper hinge, 51 is a first rotating portion (upper housing side), 52 is a second rotating portion (upper housing side), 53 is a receiving portion (upper housing side), 53A is a groove portion, 53B is a stopper portion, 6 is an imaging unit, 61 is a lens-barrel (camera unit), 62 is a holder (cylindrical member) (camera unit), 62C is a tubular portion (shaft portion), 62D is a groove portion, 63 is a cap (camera unit), 63A is an aperture window, 64 is a lens cover (camera unit), 65 is (coming-off preventing) ring (camera unit), 66 is a printed circuit board, 67 is a flexible circuit board, 7 is an interlocking mechanism, 71 is a connecting member (member to be restricted), 71A is a notched portion, 72 is a collar (annular member) (second friction member), 73 is an E-ring (or a C-ring) (first friction member), and 74 is a ring (direction-of-axis force imparting means).

BEST MODE FOR CARRYING OUT THE INVENTION

Referring now to the accompanying drawings, a detailed description will be given of an embodiment of the invention.

FIG. 1 shows a portable telephone to which a portable terminal apparatus with a camera in accordance with the embodiment of the invention is applied. This portable telephone includes a main body portion having a lower housing 1, an upper housing 2, and a hinge portion 3, as well as an imaging unit 6 and an interlocking mechanism 7.

The lower housing 1 has a structure including, among others, an inner casing 1A, an outer casing 1B, an inner frame 1C (see FIG. 2) formed of an appropriate material such as magnesium. Further, this lower housing 1 is provided with an operating section having various buttons including a plurality of buttons 11 including a numeric keypad, a cursor button 12, function buttons 13 such as power supply, start, telephone directory, and clear buttons, and a voice manner button 14, as well as an unillustrated printed circuit board, an unillustrated microphone being provided at a position close to an end portion thereof.

The upper housing 2 has a structure including, among others, an inner casing 2A, an outer casing 2B, an inner frame 2C (see FIG. 2) formed of an appropriate material such as magnesium and screwed onto an inner casing 2A. Further, this upper housing 2 is provided with, among others, a printed circuit board 66 (see FIG. 2) and a display section 21 including a liquid-crystal display unit capable of displaying an image picked up by a camera of the imaging unit 6 which will be described later, an unillustrated speaker being provided at a position close to an end portion thereof. Even though a various operating buttons are not provided on this upper housing 2, they may be provided.

The hinge portion 3 connects the upper housing 2 to the lower housing 1 in such a manner as to be capable of folding them down, and as a general structure the hinge portion 3 has a lower hinge 4 which is integral with the lower housing 1 and an upper hinge 5 which is integral with the upper housing 2.

Of these, the lower hinge 4 has, among others, a first rotating portion 41 having the shape of a half cylinder (semi-long cylinder) and a second rotating portion 42 having the shape of a cylinder (short cylinder), which are integrally provided in such a manner as to project from the aforementioned inner casing 1A, as well as a half cylinder-shaped receiving portion which projects from the inner frame 1C and is integrated to an inner peripheral surface of the first rotating portion 41 by press-fitting or the like and a cylindrical shaft portion (neither of the portions are shown).

The first rotating portion 41, together with the second rotating portion 42, is arranged to hold the upper housing 2 such that the upper housing 2 undergoes rotating motion in a stable state along the axial direction. In addition, the aforementioned shaft portion provided on the first rotating portion 41 side is adapted to rotatably support a second rotating member 52, which will be described later, on the upper hinge portion 5 side integrally with the first rotating portion 41.

The second rotating portion 42 is formed integrally on an upper end portion of the inner frame 1C, and rotatably supports the imaging unit 6 side. In addition, an auxiliary receiving portion 43 having the shape of a projecting piece is formed on an upper end portion of the inner frame 1C adjacent to this second rotating portion 42 in a state in which the auxiliary receiving portion 43 is in contact with a first rotating portion 51 on the upper hinge 5 side or in a state in which a very small gap is being maintained therebetween. This auxiliary receiving portion 43 is adapted to support or guide the rotating motion of the first rotating portion 51, and the auxiliary receiving portion 43 in this embodiment is formed with the portion of a circular arc corresponding to a central angle of approximately 45 degrees, specifically the length of a circular arc which is 1/8 or thereabouts of the entire circumference.

Meanwhile, the upper hinge 5 has the first rotating portion 51 having the shape of a half cylinder (semi-long cylinder) and formed integrally with the aforementioned outer casing 2B of the upper housing 2; the second rotating portion 52 having the shape of a cylinder (short cylinder), which is formed of an appropriate metal separately from the outer casing 2B and which is integrally fixed to the inner frame 2C, which will be described later, by press-fitting or the like; and a receiving portion 53 (see FIG. 2) having the shape of a half cylinder (semi-long cylinder) and formed integrally on the inner surface side of the first rotating portion 51 by press-fitting or the like.

Figure 2:
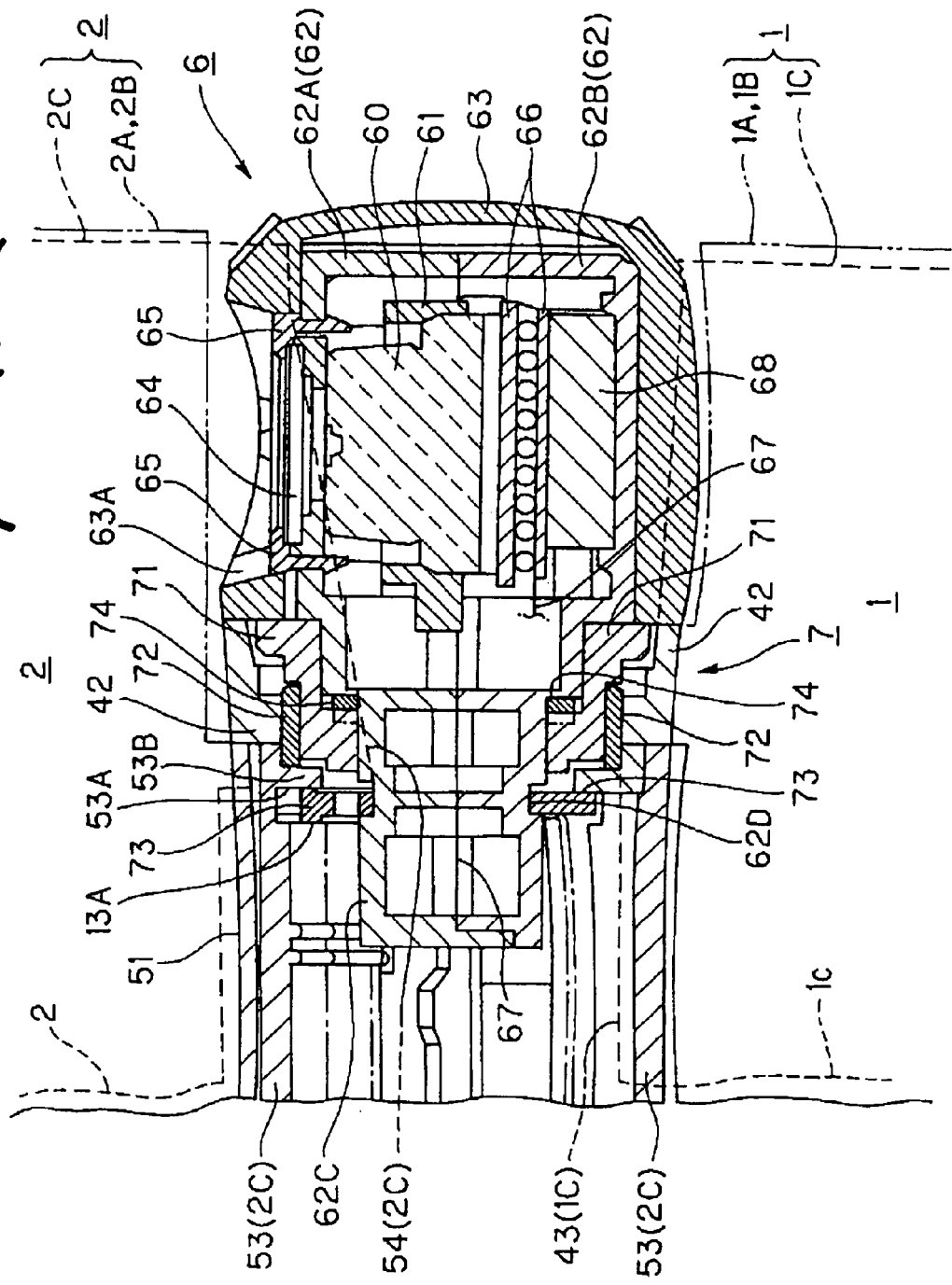
FIG. 2 is a cross-sectional view taken along line II-II in FIG. 1.

As shown in FIG. 2, the receiving portion 53 which is integral with the first rotating portion 51 is interlocked with the rotating motion of the upper housing 2, and is arranged to undergo rotating motion in a freely rotating state (integrally with the imaging unit 6) with respect to a collar 72, which will be described later, and the second rotating portion 42 of the lower housing 1. For this reason, the coefficient of friction of the receiving portion 53 with respect to an E-ring 73 is set to be large (larger than the coefficient of friction with the collar 72 and the second rotating portion 42 of the lower housing 1).

In addition, as shown by the dotted lines in FIG. 2, a pair of left and right auxiliary receiving portions 54 (only the right-hand side is shown in FIG. 2) are provided projectingly on the inner frame 2C. These auxiliary receiving portions 54 are formed by projecting pieces projecting in a substantially arcuate shape from a lower edge portion of the inner frame 2C, and are adapted to support or guide the rotating motion of the upper housing 2 in a stable state in a state in which the auxiliary receiving portions 54 are in contact with the first rotating portion 41 and the second rotating portion 42 or in a state in which a very small gap is being maintained therebetween. It should be noted that the auxiliary receiving portions 54 in this embodiment are each formed with the portion of a circular arc corresponding to a central angle of approximately 45 degrees, i.e., the length of a circular arc which is ⅛ or thereabouts of the entire circumference.

Furthermore, the lower hinge 4 and the upper hinge 5 are provided with appropriate stoppers (not shown) which are restricting members for restricting the range of rotation of the imaging unit 6, and a connecting member 71 which is a member to be restricted on the interlocking mechanism 7 side, which will be described later, is arranged to be retained by them. The stoppers in this embodiment are formed at two appropriate positions so that the connecting member 71 rotates in the range of about 270 degrees.

Figure 3:
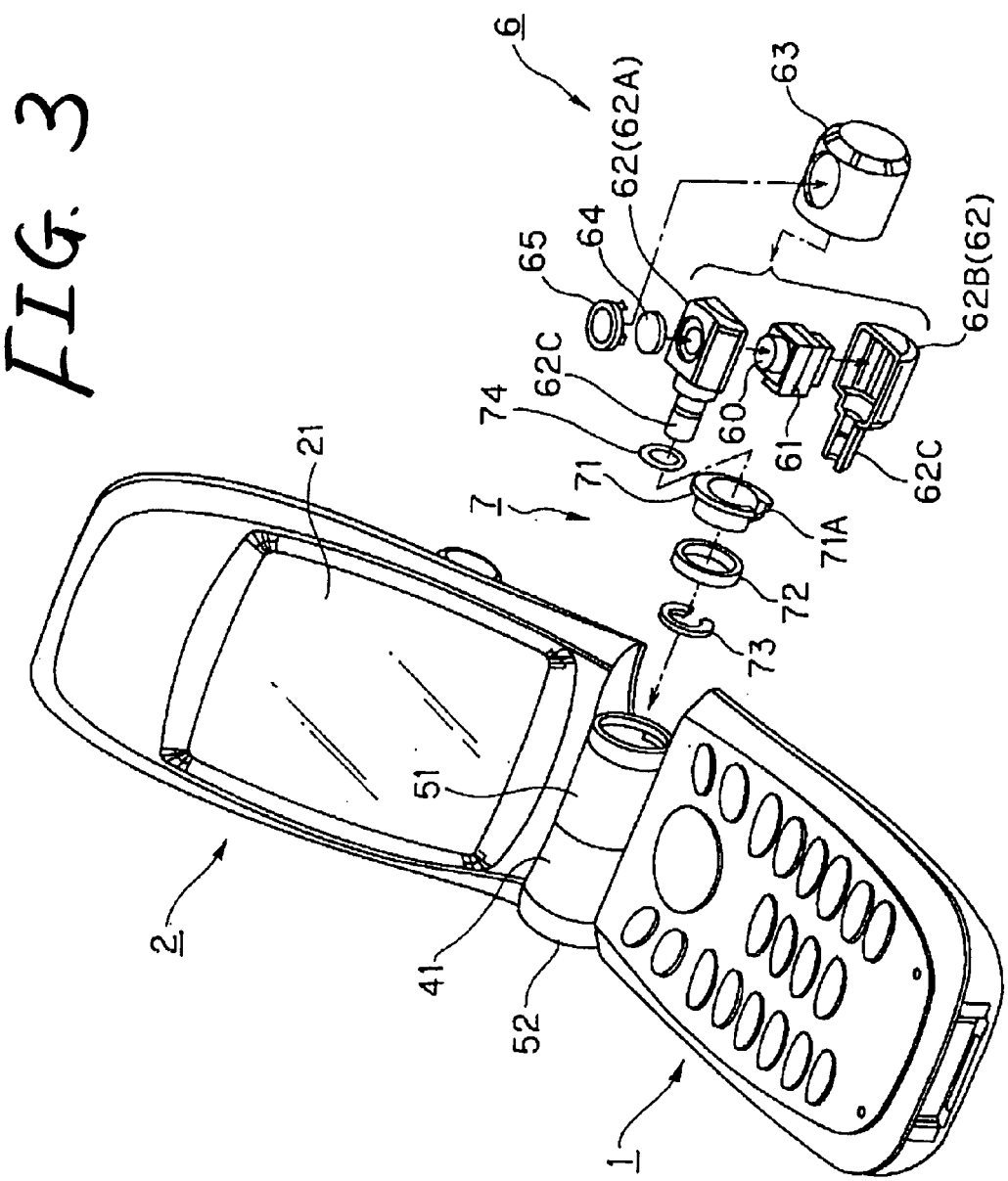
FIG. 3 is an exploded perspective view of essential portions shown in FIG. 1.

The imaging unit 6 is provided rotatably with respect to the hinge portion 3, and the angle of rotation is arranged to be capable of being adjusted freely by the rotating motion of the upper housing 2 and the manual rotating motion by gripping with fingers or the like. As shown in FIGS. 2 and 3, as a camera unit the imaging unit 6 in this embodiment includes a lens-barrel 61, a holder 62 divided into upper and lower parts for holding the lens-barrel 61, a cap 63 which is fitted over this holder 62 from a lateral direction, a lens cover 64, and a ring 65 for preventing the cap 63 from coming off.

Figure 4:
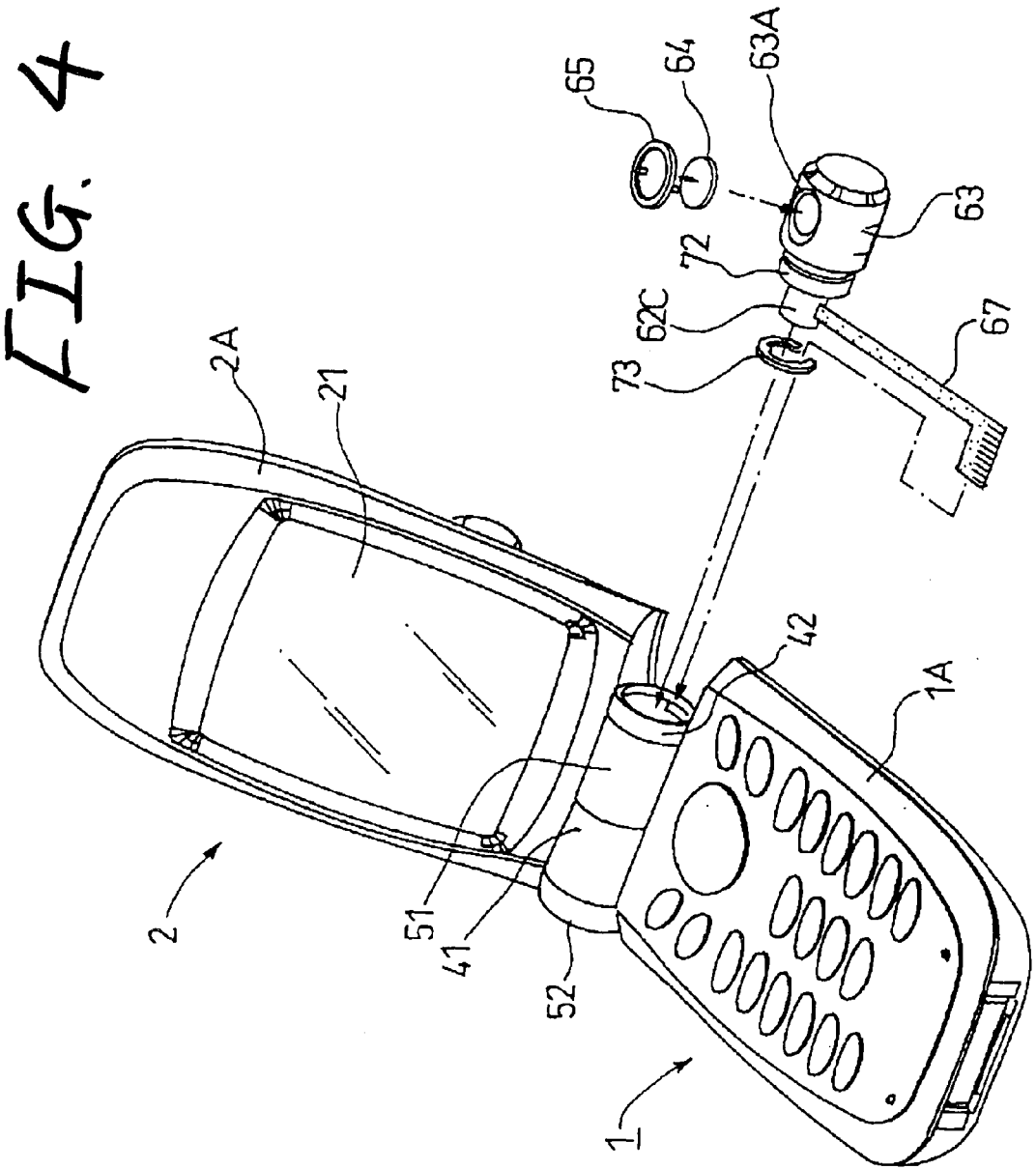
FIG. 4 is an explanatory diagram illustrating a state of assembly of the essential portions shown in FIG. 1

The holder 62 is formed by joining an upper holder 62A and a lower holder 62B, and the (imaging) lens 60 fixed in the lens-barrel 61 over a cushioning material 68 is accommodated in the hollow interior thereof. In addition, an unillustrated CCD and the printed circuit board 66 for mounting this CCD thereon are mounted inside this holder 62 at a focusing position of the lens 60. Further, a flexible circuit board 67 is led out from this printed circuit board 66 so as to electrically connect the CCD on the imaging unit 6 side and the unillustrated printed circuit board and the like on the upper housing 2 (or the lower housing 1) side. Specifically, this flexible circuit board 67 is led out to the hinge portion 3 side by making use of the joining surfaces of the upper holder 62A and the lower holder 62B, as shown in FIG. 4.

An aperture window 63A for allowing the light from an object of shooting to enter the lens 60 is formed in the cap 63, and the arrangement provided is such that the shooting direction can be freely changed and set within a predetermined angular range by the opening/closing motion of the upper housing 2 and the rotating operation of the cap 63 by gripping with fingers or the like.

The interlocking mechanism 7 is for causing the lens 60 to be exposed from the upper and lower housings 1 and 2 to the outside and to accommodate the lens 60 inside the housings 1 and 2. The arrangement provided is such that the imaging unit 6 is rotated in interlocking relation to the opening and closing motion of the upper housing 2, and is rotatively operated with fingers or the like, as described above.

As shown in FIGS. 2 and 3, this interlocking mechanism 7 has the connecting member 71 which is fitted over a tubular portion 62C projecting laterally from the holder 62 of the imaging unit 6, the collar 72 fitted over this connecting member 71, the E-ring (or C-ring) 73, and a ring 74.

The connecting member 71 is for rotatably holding the imaging unit 6 with respect to the hinge portion 3, and for rotating the imaging unit 6 with a frictional force (μ) integrally with the upper housing 2. In particular, this connecting member 71 constitutes a rotation restricting member to allow the rotating motion of the imaging unit 6 with respect to the lower housing 1 only in a fixed range. Namely, as shown in FIG. 3, as for this connecting member 71, a notched portion 71A in which a region corresponding to 90 degrees in terms of the central angle is notched is provided in a portion of an outer peripheral portion thereof, and as either surface of this notched portion 71A is retained by the stopper of the aforementioned restricting member, further rotation is prevented.

For this reason, in a case where the upper housing 2 is closed by the rotating motion, the connecting member 71 is interlocked with the upper housing 2 until the connecting member 71 is retained by the stopper of the restricting member. However, the connecting member 71, upon being thus retained, is not interlocked with the upper housing 2, and only the upper housing 2 rotates as it is. On the other hand, in a case where the upper housing 2 is opened from the closed state by the rotating motion, the connecting member 71 undergoes rotating motion as it is in interlocking relation to the upper housing 2 from the position where it is held. Further, since this connecting member 71 is retained by the stopper of the restricting member with respect to rotation of a fixed angle or more, in the case where the upper housing 2 is opened, the lens 60 on the imaging unit 6 side, which rotates integrally with the connecting member 71, is always oriented at a position falling within the predetermined angular range. Consequently, it is possible to simplify the operation of positional adjustment of the lens 60 when the upper housing 2 is opened, thereby making it possible to improve the operating efficiency.

The collar 72 is inserted between an outer peripheral surface of the connecting member 71 and an inner peripheral surface of the second rotating portion 42 provided integrally on the inner frame 1C of the lower housing 1 making up a portion of the lower hinge portion 4, and the collar 72 constitutes a second friction member. Namely, this collar 72 is formed of an appropriate metallic material, and is arranged such that when the upper housing 2 undergoes rotating motion, the receiving member 53 formed integrally with the upper housing 2 and hence the connecting member 71 rotate in a state of being relatively rotatable with respect to this collar 72. For this reason, as for this collar 72, if it is assumed that its maximum coefficient of friction with respect to the inner peripheral surface of the second rotating portion 42 is μ1 and that its maximum coefficient of friction with respect to the outer peripheral surface of the connecting member 71 is μ2, the E-ring 73 which will be described later has the following relationships concerning its maximum coefficients of friction μ3 and μ4 with respect to the receiving portion 53 on the upper housing 2 side and the tubular portion 62C of the holder 62:

$$\mu1<\mu3 \qquad (1)$$

$$\mu2<\mu3 \qquad (2)$$

or, $$\mu1<\mu4 \qquad (3)$$

$$\mu2<\mu4 \qquad (4)$$

On the other hand, the E-ring 73 is formed in a substantially cylindrical shape, and is inserted between the tubular portion 62C of the holder 62 and the receiving portion 53 of the upper housing 2 side which is press-fitted to the inner peripheral surface of the first rotating portion 51 making up a portion of the upper hinge 5. Namely, this E-ring 73 is fitted in a groove portion 62D of the tubular portion 62C of the holder 62, and is fitted in a groove portion 53A provided in the receiving portion 53 on the upper housing 2 side, so as to prevent the imaging unit 6 from coming off. It should be noted that, as for the groove portion 62D of the holder 62 to which this E-ring 73 is inserted, its axial length is greater than the axial length of the E-ring 73. Accordingly, this E-ring 73 is arranged to be capable of moving in the axial direction in the groove portion 62D.

In addition, this E-ring 73 has protruding portions 73A projecting from both surface portions of its edge portion side in the form of collars, and the arrangement provided is such that the E-ring 73 comes into line contact with the groove portion of the receiving portion 53 at these protruding portions 73A. In particular, this E-ring 73 constitutes a first friction member since, when the upper housing 2 undergoes rotating motion, by making use of a frictional force with respect to the receiving portion 53 formed integrally with the upper housing 2, the E-ring 73 rotates integrally with this receiving portion 53 (and the connecting member 71), and its coefficient of friction is set to be greater than that of the collar 72 which is the second friction member.

Namely, this E-ring 73 is arranged to satisfy the above-described relationships (1) and (2), or (3) and (4) if its maximum coefficients of friction with respect to the receiving portion 53 on the upper housing 2 side and the tubular portion 62C of the holder 62 are assumed to be $\mu 3$ and $\mu 4$, respectively.

Further, as for this E-ring 73 which is the first friction member, its maximum frictional forces with respect to the receiving portion 53 and the tubular portion 62C of the holder 62 are set to be smaller than the rotatively operating force by means of fingers, such that an operator is able to rotatively operate the imaging unit 6 reliably by means of his or her fingers.

It should be noted that the E-ring 73 in this embodiment is formed of an appropriate synthetic resin material having a certain degree of a spring characteristic with respect to the radial direction, and is arranged to be is able to ride over a stopper portion 53B provided on the receiving portion 53 and to fit into the groove portion 53A formed on its inner side.

In FIG. 2, the ring 74 made of silicone rubber has an annular shape with an outside diameter D1, an inside diameter D2, and a thickness t, is inserted up to a root portion of the tubular portion 62C projecting laterally from the holder 62 of the imaging unit 6. Subsequently, the above-described connecting member 71, which is formed of an oil retaining resin, an oil retaining metal, or a material such as POM having a high sliding characteristic, is fitted over them, thereby forming a camera unit.

In this camera unit, the connecting member 71 is inserted in the collar 72 fitted unrotatably in the main body portion, and the E-ring 73 is fitted to the groove portion 62D formed on one end side of the tubular portion 62C, and is rotatably fitted to the main body portion of the portable telephone, specifically the second rotating portion 42 which is a bearing portion. Upon the fitting of the E-ring 73, the ring 74 is adapted to be fitted in such a manner as to be compressed. Specifically, the arrangement provided is such that the thickness t of the ring 74 changes from about 2t/3 to t/2. The ring 74 generates repulsion by the compressed portion, and this repulsion can be imparted to the camera unit.

It should be noted that since the repulsion is based on compression, the repulsion is arranged to act only in the thrusting direction of the camera unit.

Next, a description will be given of the operation of the portable telephone with a camera having a rotating function in accordance with this embodiment.

For example, it is assumed that the camera unit is oriented in an arbitrary direction, and that the camera is rotated in order to shoot the user himself or herself holding the portable telephone in his or her hand. At this time, the torque T for rotating the camera unit can be expressed by the following formula (5):

$$T = \mu \cdot r \cdot N \quad (5)$$

where $\mu$: coefficient of friction when the camera unit rotates r: central radius of the E-ring 73 (central radius between the outside diameter and the inside diameter)

N: direction-of-axis force (repulsion acting in the thrusting direction of the camera unit)

From this formula (5), it can be appreciated that the torque T at the time of rotating the camera unit is proportional to the direction-of-axis force N since the coefficient of friction u and the central radius r are constants.

Accordingly, if this direction-of-axis force N is set arbitrarily, the torque for rotating the camera unit can be set to a predetermined value. Here, since the ring 74 is provided in such a manner as to be compressed between the connecting member 71 and the large-diameter tubular portion 62C accommodating the camera as in the embodiment of the invention, its repulsion N becomes equivalent to an abutting force with which the E-ring 73 abuts against the stopper portion 53B of the receiving portion 53.

Further, a description will be given of the coefficients of friction in the case where the camera unit is rotated. Although the coefficients of friction $\mu 1$ to $\mu 4$ are present as described above, settings can be provided such that the maximum coefficient of friction $\mu 1 = 0$ since the collar member 72 is set in a nonrotatable state by being press-fitted and held onto the inner peripheral surface of the second rotating portion 42, $\mu 2 = 0$ since the connecting member 71 rotating with respect to the fixed collar member 72 is formed of a material whose sliding characteristic is high, and $\mu 4 = 0$ since the E-ring 73 is fitted to the tubular portion 62C of the holder 62B.

Accordingly, the coefficient of friction at the time when the camera unit is rotated can be set to $\mu 3$. It should be noted that since the ring 74 is arranged to rotate together with the rotation of the camera unit while the ring 74 is being clamped between the cylindrical portion 62 and the connecting member 71, torsional stress cannot be possibly applied to the ring 74, so that the ring 74 is prevented from being pulled off or cut off.

Here, a description will be given of a case in which the ring 74 is provided in such a manner as to be compressed between the E-ring 73 and the stopper portion 53B. In this case, the direction-of-axis force N can be applied to the camera unit as in this embodiment. However, since the arrangement provided is such that the ring 74 does not rotate together even if the camera unit is rotated, torsional stress is applied to the ring 74. For this reason, if the rotation of the camera unit is repeated a plurality of times, breakage of the ring 74 can possibly result.

In addition, if the camera unit is rotated in a predetermined direction with fingers and the fingers are released after stopping, since the torsional stress applied to the ring 74 tends to become zero, so-called backlash is present in which the camera unit slightly returns to the side opposite to the rotating direction. Namely, even if the camera unit is oriented in a predetermined direction with the fingers, the orientation changes upon release of the fingers, so that this is very inconvenient to the user.

Further, if a force is applied in the radial direction of the camera unit, a portion of the ring 74 is further compressed, so that the camera unit jogs in the radial direction, so that there is a problem in that a feeling that the apparatus might be broken is imparted to is the user.

Accordingly, the arrangement of the embodiment of the invention in which the torsional stress is not applied to the ring 74 for imparting the thrust force to the camera unit as in the embodiment of the invention is optimally suited. Moreover, since this ring 74 is formed of silicone rubber, versatility is high and availability is excellent, the ring 74 is suitable for mass production. In addition, since a predetermined torque can be imparted to the camera unit with a simple arrangement, the performance of the apparatus can be remarkably enhanced while avoiding the heavy weight of the apparatus.

It should be noted that, in the embodiment of the invention, the ring 74 is provided so as to rotate together with the rotation of the camera unit, the invention is not limited to this embodiment. Namely, insofar as the arrangement provided is such that the torsional stress is not applied to the ring at the time of rotating the camera unit, it is possible to obtain a predetermined torque and eliminate the backlash.

For example, if the aforementioned ring 74 is provided in such a manner as to be compressed between the E-ring 73 and the stopper portion 53B, and a spacer which is immobile with respect to the ring 74 is added between the E-ring 73 and the ring 74, it is possible to attain a structure which prevents the torsional stress from occurring in the ring 74. However, since this newly results in the addition of a part, higher cost results, so that this arrangement is unsuitable for mass production, but serves the same purpose as the technical means for solving the problem.

Incidentally, according to an experiment by the present inventors, the range of approximately 30 to 200 gf·cm was suitable as the torque for facilitating rotation on the part of the user and for continuously stopping, so that in the embodiment of the invention this torque is set to approximately 100 gf·cm by taking into consideration dimensional variations in fabricating the apparatus.

It should be noted that this application is based on Japanese Patent Application No. 2001-185261 filed on Jun. 19, 2001, and its contents are incorporated herein by way of reference.

INDUSTRIAL APPLICABILITY

As described above, in accordance with the invention, since the ring which is formed of an elastic member such as silicone rubber and which rotates together with the rotation of the camera unit capable of rotating with respect to the main body portion is provided in such a manner as to be compressed, and its repulsion is imparted to the camera unit. Therefore, since a predetermined torque is required at the time of changing the orientation of the camera unit, the state after the rotation stop is maintained and continued, and usability improves in that it is possible to prevent the orientation of the camera unit from changing easily after the orientation of the camera unit has been set for the purpose of shooting.

In addition, in accordance with the invention, since it is possible to prevent the orientation of the camera unit from changing easily even in a case where the camera unit is automatically closed in interlocking relation to the folding-down operation, it is possible to prevent the trouble that, owing to the vibration from the outside or at the time of putting the apparatus into or out of a pocket, the orientation of the camera unit changes when it is carried, causing the lens or the cover glass of the camera unit to become exposed and become stained or damaged.

The invention claimed is:

1. An information terminal apparatus with a camera having a rotating function, comprising:
an imaging unit including:
a camera unit rotatably supported by a main body portion of said information terminal apparatus;
direction-of-axis force imparting means formed of an elastic member for imparting a direction-of-axis force in a thrusting direction of said camera unit; and
means for preventing the occurrence of torsional stress for preventing the occurrence of torsional stress in said direction-of-axis force imparting means.

2. The information terminal apparatus with a camera having a rotating function according to claim 1, wherein said elastic member is interposed between said camera unit and said main body portion of said information terminal apparatus.

3. The information terminal apparatus with a camera having a rotating function according to claim 2, wherein said elastic member is formed of a rubber member and is provided in such a manner as to be compressed in the thrusting direction of said camera unit.

4. The information terminal apparatus with a camera having a rotating function according to claim 1, wherein said elastic member is formed of a rubber member and is provided in such a manner as to be compressed in the thrusting direction of said camera unit.

5. An information terminal apparatus with a camera having a rotating function, comprising:
a camera unit including a cylindrical member having a shaft portion at one end thereof and for accommodating a camera therein, and an arched member which is fitted over said shaft portion;
a main body portion of said information terminal apparatus including a bearing portion for holding said arched member and for rotatably supporting said camera unit; and
an elastic member provided between said main body portion and said cylindrical member so as to impart a direction-of-axis force in a thrusting direction of said camera unit,
wherein said elastic member is provided so as to rotate together with the rotation of said camera unit.

6. The information terminal apparatus with a camera having a rotating function according to claim 5, wherein said elastic member is interposed between said camera unit and said main body portion of said information terminal apparatus.

7. The information terminal apparatus with a camera having a rotating function according to claim 5, wherein said elastic member is formed of a rubber member and is provided in such a manner as to be compressed in the thrusting direction of said camera unit.

* * * * *